Aug. 2, 1960     B. M. HYMAN ET AL     2,947,133
ADJUSTABLE SKEWING OF CORN SNAPPING ROLLS
Filed Dec. 23, 1957     3 Sheets-Sheet 1
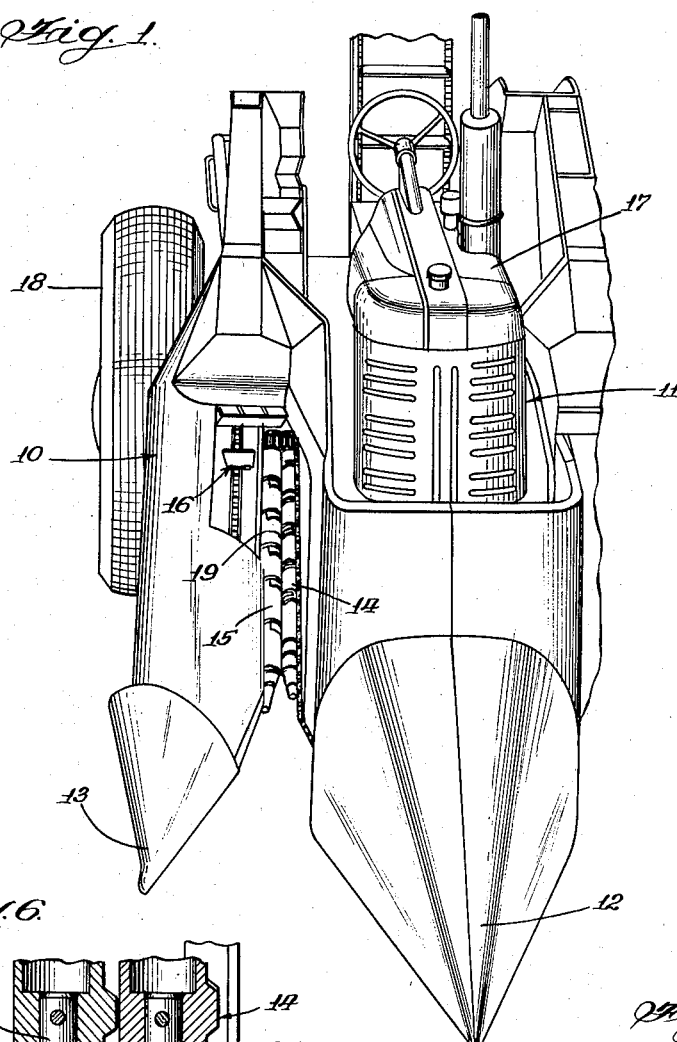
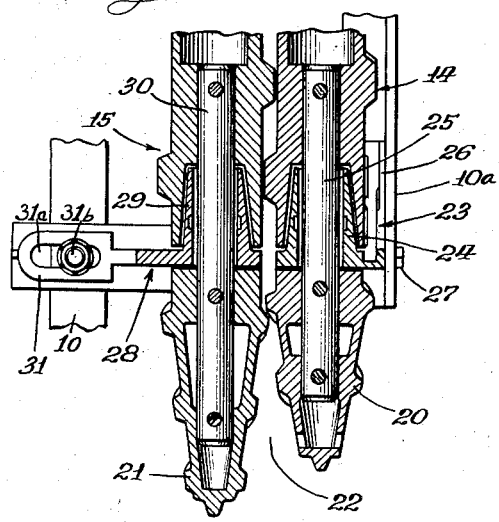
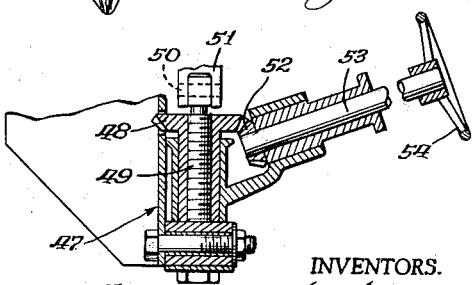
INVENTORS.
Benjamin M. Hyman
Elof K. Karlsson
Paul O. Pippel
Atty.

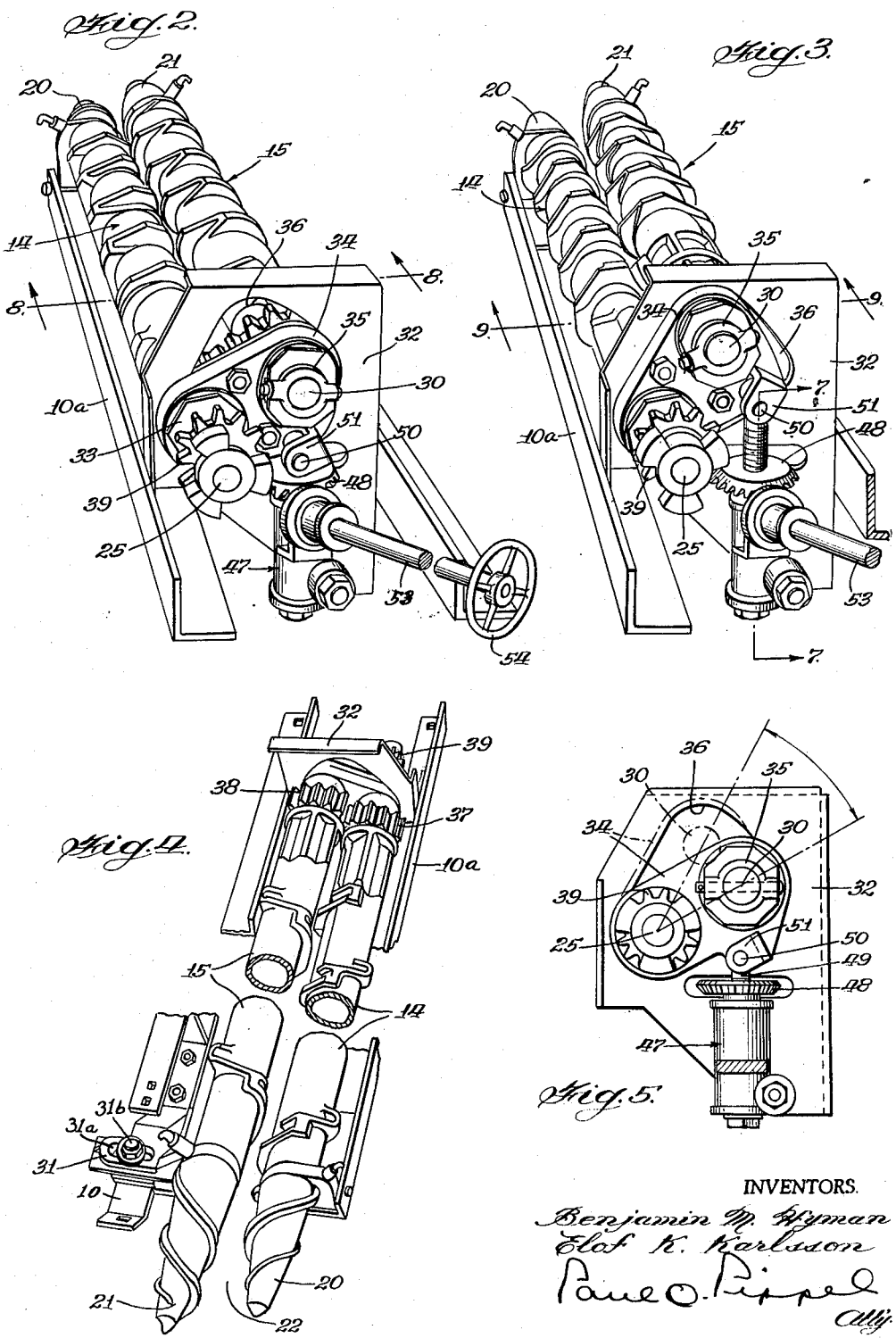

United States Patent Office 2,947,133
Patented Aug. 2, 1960

2,947,133
ADJUSTABLE SKEWING OF CORN SNAPPING ROLLS

Benjamin M. Hyman, East Moline, and Elof K. Karlsson, Moline, Ill., assignors to International Harvester Company, Chicago, Ill., a corporation of New Jersey Filed Dec. 23, 1957, Serial No. 704,717

4 Claims. (Cl. 56—110)

This invention relates to a new and improved adjustable skewing of corn snapping rolls.

Corn snapping rolls are employed for the purpose of snapping ears of corn from stalks on which the ears grow. Generally the stalk is left standing in the ground at a time when the ears are snapped from the stalk. The snapping rolls are inclined downwardly and forwardly on a field traversing machine so that the standing stalks are fed to a position between the snapping rolls, whereupon the rolls which cooperate with each other pull the stalk downwardly therebetween to effect a snapping of the ears therefrom. Following snapping of the ears from the stalks it is desirable to have the ears drop to one side thereof and be elevated through the corn picker for further treatment of the ears, such as husking. Usually the rolls are inclined in such a manner that one of the rolls is slightly higher that the other roll thereby insuring that the juncture of the rolls is substantially at the upper level of the lower roll to provide for easy discharge of the snapped ears from the surface of the rolls. More efficient snapping of the ears from the stalks occurs upon different angular relationships of the rolls with respect to each other under varying conditions of the corn.

It is therefore a principal object of this invention to provide means for adjustably skewing corn snapping rolls in a corn picker.

An important object of this invention is to supply means for tilting the snapping rolls of a corn picker from one end thereof so that their relationship changes from one end thereof to the other, whereby the rolls at their lower ends have a lesser angular relationship than the rolls at their upper ends which have a greater inclined angular relationship.

Another important object of this invention is the provision of means for angularly changing the relationship of the upper ends of corn snapping rolls while maintaining a stable or stationary angular relationship of the lower ends of the snapping rolls.

Still another important object of this invention is to provide hand cranking means for skewing the snapping rolls at their upper ends so that the angular relationship of the cooperative snapping rolls increases from their lower ends to their upper ends.

Other and further important objects and advantages will become apparent from the disclosures in the following specification and accompanying drawings.

In the drawings:

Figure 1 is a perspective view of a portion of a corn picker with the snapping rolls and mounting therefor of this invention shown therein;

Figure 2 is a perspective view detail of the snapping rolls and their mounting with the rolls in one adjusted position.

Figure 3 is a similar perspective view detail of the snapping rolls wherein the rolls are moved to a maximum skewed position.

Figure 4 is another perspective view detail of the snapping rolls and showing generally the top surface thereof to depict the bearing supports and the interengaging gears.

Figure 5 is an end view of the upper ends of the snapping rolls and showing the means for adjustably skewing the snapping rolls from one end thereof to the other;

Figure 6 is a sectional view detail of the bearing supports for the lower forward ends of the snapping rolls.

Figure 7 is a sectional view taken on the line 7—7 of Figure 3.

Figure 8:
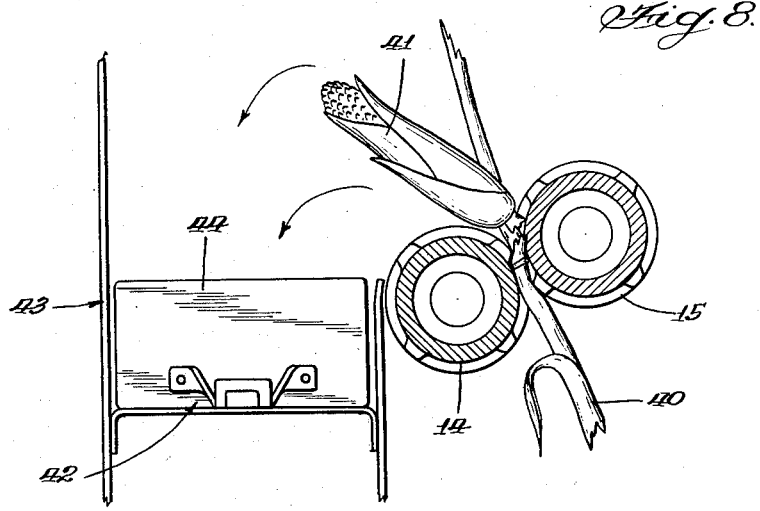
Figure 8 is a sectional view taken on the line 8—8 of Figure 2.

As shown in the drawing the reference numeral 10 indicates generally a corn picker which is mounted on an agricultural type tricycle tractor 11. The tractor mounted corn picker includes a center divider 12 and an outer gatherer divider 13. A pair of cooperative snapping rolls 14 and 15 are mounted in the corn picker between the divider members 12 and 13. An ear corn elevator or conveyor 16 is provided within the side divider 13 adjacent the upper ends of the rolls 14 and 15. The conveyor is for the purpose of receiving snapped ears of corn and elevating them upwardly and rearwardly for further treatment by the corn harvesting machine. The picking unit comprising the spaced crop dividers and the included snapping rolls is disposed on the tractor between the long narrow body 17 of the tractor and the relatively widely spaced apart traction wheel 18. The cooperative snapping rolls 14 and 15 are journally mounted on a frame supporting structure 10a of the corn picker 10 in such a manner that they can be rotatably driven inwardly toward each other so that the juncture shown at 19 is provided with a downwardly moving surface from both rolls, thereupon causing stalks fed therebetween to be pulled downwardly and the ears snapped from the stalks when they arrive at the juncture 19. The snapping rolls 11 and 12 include tapering points 20 and 21, respectively, for the purpose of guiding the stalks into the roll juncture 19. The tapering points 20 and 21 provide a wide-mouthed entrance to the rolls 11 and 12 as shown at 22. A bearing member 23 is equipped with a sleeve-like journal member 24 which engages a central shaft 25 of the snapping roll 14 immediately rearwardly of the tapered point 20. An outer extension 26 of this bearing bracket 23 is affixed to the supporting structure 10a by the screw and nut assembly 27. The roll 14 is thus journally mounted on and with respect to the supporting structure 10a. Similarly, a bearing bracket 28 is provided for the roll 15 and has a sleeve-like journal member 29 engaging a central shaft 30 of the roll 15. An outer extension 31 of the bearing bracket 28 is likewise affixed to the supporting structure 10 in the same manner as the outer structure 26 of the bracket 23 is affixed to the basic supporting structure 10a of this corn picker. An elongated slot 31a in the outer extension 31 permits a straight in and out adjustment of the journal member 29 with respect to the supporting structure 10. This adjustment is accomplished by a loosening and a retightening of the bolt 31b which passes through the elongated slot 31a and threadedly engages the supporting structure 10.

The supporting structure 10a extends upwardly and rearwardly around the snapping rolls 14 and 15 and has a transversely disposed plate-like member 32 at the upper rearward end of the rolls. The central shaft 25 of the roll 14 passes through the plate 32 and is journally mounted therein on a bearing member 33. Similarly, the roll 15 has the upper end of its core 30 passing lengthwise through the plate 32. An arm member 34 is journaled at its lower end about the roll 14 and on the bearing 33.

This arm extends angularly outwardly and journally receives the core member 30 of the roll 15. A bearing member 35 is disposed intermediate the shaft core 30 and the arm 34. The arm or bracket 34 thus constitutes a means for swinging the upper end of the snapping roll 15 angularly about the snapping roll 14 inasmuch as the arm 34 is journally mounted for pivotal movement about the roll 14. An arcuate slot 36 is provided in the end supporting plate 32 to permit movement of the upper end of the roll 15 therethrough.

Figure 9:
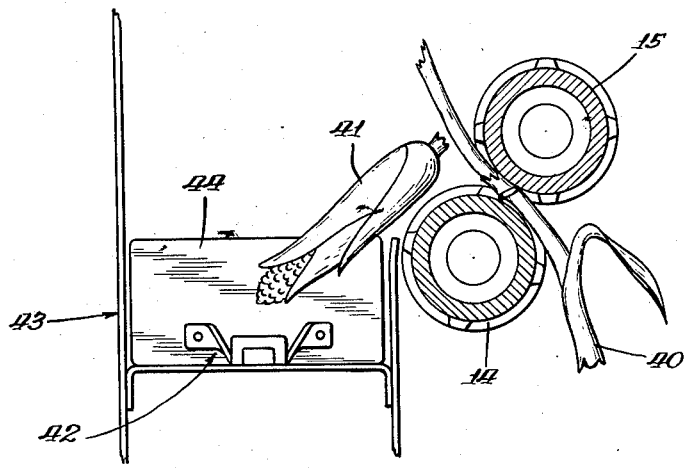
Figure 9 is a sectional view taken on the line 9—9 of Figure 3.

The cooperative snapping rolls 14 and 15 are equipped with spur gears 37 and 38, respectively, which interengage to effect a driving of the roll 15 from the roll 14 which, in turn, is driven by means of a sprocket or the like 39 located at the outer end of the central shaft or core member 25. In the device of this invention the roll 14 remains substantially fixed while the roll 15 has its upper end swingable in an arc defined by the arm or plate member 34 through the arcuate slot 36 so that the relative position of the rolls 14 and 15 may assume a skewing. As shown in Figure 3, the lower ends of the rolls 14 and 15 are disposed at a relatively low angle with respect to each other, and as shown in Figure 4 the roll 15 has been swung around to a position almost over the roll 14 thereby causing a twisting, or a substantial twisting, of the rolls and their line of juncture from their lower ends to their upper ends. This skewing of the snapping rolls causes an increased effectiveness in the snapping of ears from corn stalks. As shown in Figures 8 and 9 the corn stalks are depicted at 40 and the ears at 41. In Figure 9 the ear 41 is shown easily and very positively dropping into an ear-corn conveyor 42 which runs within a channel member 43 and by means of flight 44 moves the ears 41 upwardly and rearwardly for further treatment by the corn picker.

The plate 32 carries a web member 45 supporting a gear mechanism 46 which comprises a housing 47, a bevel gear 48, a worm or screw shaft 49 journaled within the bevel gear 48 and arranged upon rotation of the bevel gear 48 to be more or less extended from the housing 47 for the purpose of effecting a shifting of the roll-carrying arm 34 within its arcuate slot 36. As best shown in Figures 5 and 7, the screw member 49 is pivotally attached as at 50 to a clevis-like member 51 forming a part of the arm member 34. It is thus apparent that as the screw 49 is extended or retracted within the bevel gear 48 and the housing member 47 of the gear mechanism 46, there is thus a simultaneous swinging of the roll 15 about the roll 14 at least at the upper ends of the rolls. A bevel gear 52 is mounted on a shaft 53 which is journaled within the housing member 47. The gear 52 is so arranged as to engage with the bevel gear 48. It will be apparent that rotation of the shaft 53 causes concurrent rotation of the bevel gear 48 and thus a controlling of the vertical position of the screw member 49 with respect to the housing 47 and also with respect to the bevel gear 48. The shaft 53 is preferably disposed and extends toward the operator's platform of the corn picker. The end of the shaft 53 adjacent the operator is provided with a hand wheel or the like 54 for convenient manual rotation to thus cause the snapping rolls to be skewed from their normal continuous angular relationship. The normal or regular position of the snapping rolls is shown in the sectional view of Figure 8 wherein the rolls are disposed at a particular angle with respect to each other throughout their lengths. This continuous angular relationship of the snapping rolls may be changed by the operator by rotating the hand wheel 54 to thus cause an extension of the screw shaft 49 and thus a concurrent swinging of the arm 34 about the roll 14 as a pivot. It will be apparent that this causes only the upper end of the snapping roll 15 to assume this position wherein it moves upwardly to a rather sharp angle with respect to the roll 14 as shown in Figure 9.

In the operation of the device of this invention the operator has control over the angular relationship of the cooperative snapping rolls 14 and 15 to the extent that he can change the relationship of the upper ends of the rolls thus causing a skewing or skewed position of the snapping rolls to increase the effectiveness of the snapping of the corn from the stalks. The improved snapping facilitates operation of the picker when atmospheric moisture and temperature conditions make it difficult to pick corn. In addition to accomplishing a more effective snapping, the skewed or greater inclination of the upper ends of the snapping rolls creates a better drop off of the ears of corn 41 into the adjacent ear-corn conveyor 42.

We are aware that numerous details of construction may be varied considerably without departing from the principles disclosed herein and we therefore do not propose limiting the patent granted hereon otherwise than as necessitated by the appended claims.

What is claimed is:

1. In a corn machine comprising a frame supporting structure, cooperative first and second snapping rolls carried by said frame supporting structure, both of said first and second snapping rolls mounted in journals at their one ends, said first snapping roll mounted in a relatively fixed journal at its other end, an arm member pivotally mounted on and adjacent the relatively fixed journal of the other end of the first snapping roll for arcuate swinging about the first snapping roll as an axis, the second of said snapping rolls having its other end journally mounted in said arm member spaced from its pivotal mounting, and means operatively associated with said rolls for arcuately adjustably positioning said arm member to thereby skew the rolls to any desired relationship.

2. A device as set forth in claim 1 in which the means for adjustably positioning said arm member includes a gear mechanism mounted on said frame supporting structure, a screw adjustably positionable by said gear mechanism, means joining said screw to said arm member whereby operation of said gear mechanism causes a direct angular position change of said arm member.

3. A device as set forth in claim 2 in which the gear mechanism includes a housing, a pair of cooperating bevel gears journaled in said housing, said screw threadedly engaged within one of said bevel gears, and an operating shaft fastened to said other bevel gear.

4. A device as set forth in claim 2 in which said operating shaft extends remotely from said bevel gears, and a hand wheel fastened to said shaft at its remote end for effecting snapping roll skewing.

References Cited in the file of this patent
UNITED STATES PATENTS

| | | |
|---|---|---|
| 1,145,890 | Gronke | July 13, 1915 |
| 1,881,470 | Gentry | Oct. 11, 1932 |
| 2,490,715 | Shrader | Dec. 6, 1949 |
| 2,777,273 | Heth | Jan. 15, 1957 |